March 5, 1935.  C. T. BREWER  1,993,084
CAMERA WITH BUILT-IN ACTINOMETER
Filed April 4, 1932  4 Sheets-Sheet 1

INVENTOR
CLARENCE T. BREWER
BY
ATTORNEY

March 5, 1935.  C. T. BREWER  1,993,084
CAMERA WITH BUILT-IN ACTINOMETER
Filed April 4, 1932  4 Sheets-Sheet 2

INVENTOR
CLARENCE T. BREWER
BY
ATTORNEY

March 5, 1935. C. T. BREWER 1,993,084
CAMERA WITH BUILT-IN ACTINOMETER
Filed April 4, 1932 4 Sheets-Sheet 3
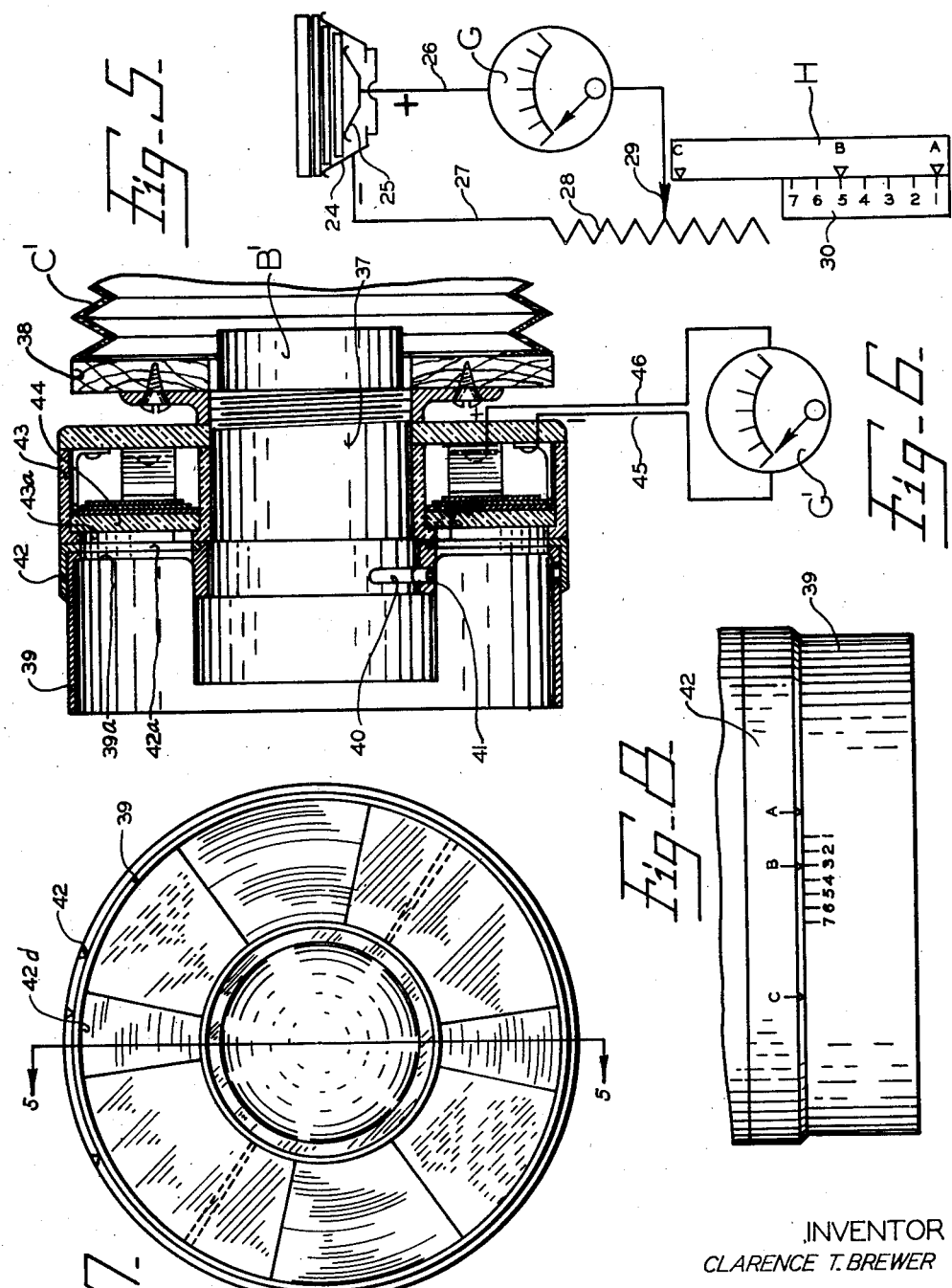

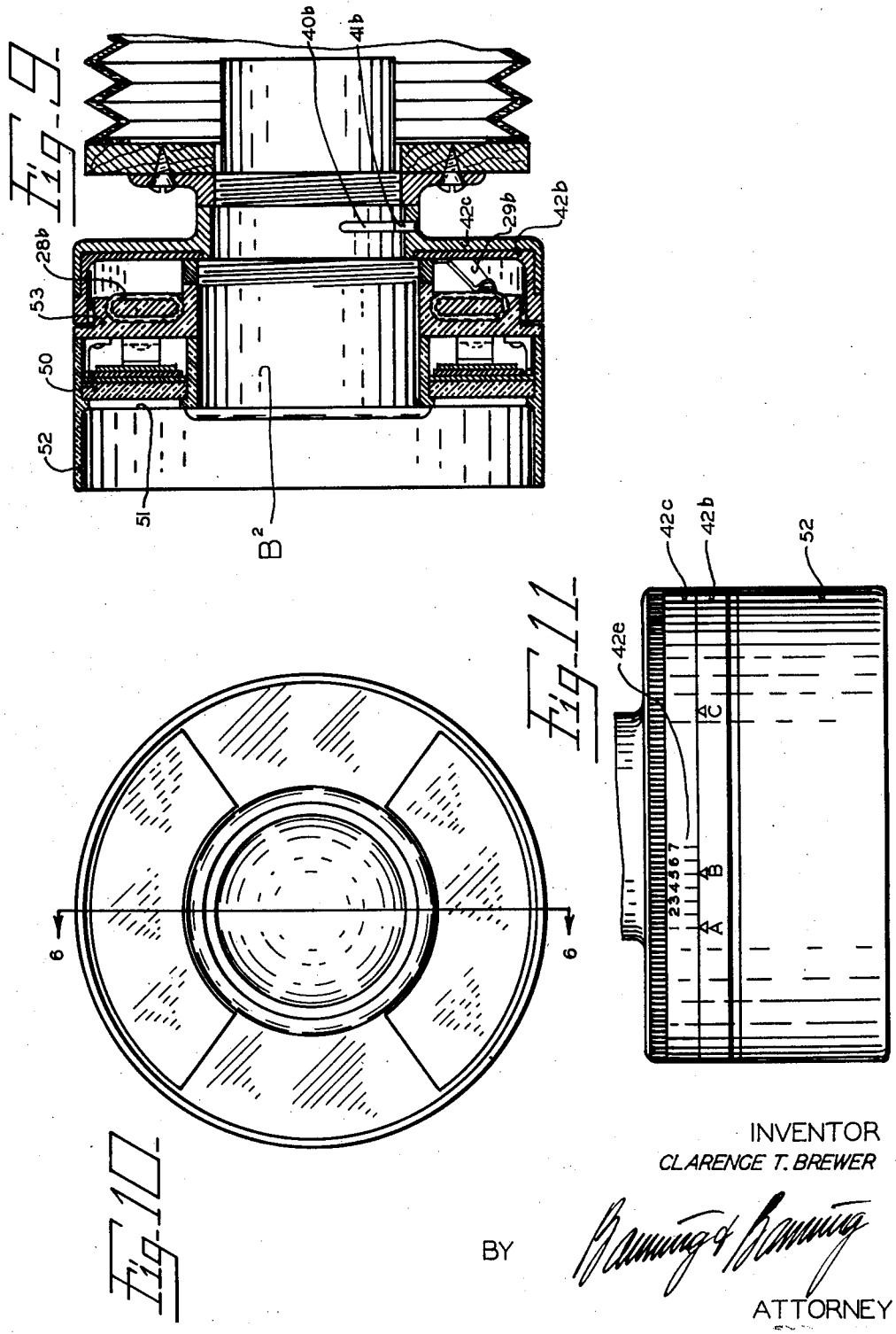

Patented Mar. 5, 1935

1,993,084

UNITED STATES PATENT OFFICE 1,993,084

CAMERA WITH BUILT-IN ACTINOMETER

Clarence T. Brewer, Chicago, Ill., assignor of one-third to Edward W. Menke and one-third to Harry E. Hillstrom, both of Chicago, Ill.

Application April 4, 1932, Serial No. 603,003

5 Claims. (Cl. 88—23)

An object of this invention is to provide a camera with means which will enable a photographer to read directly the proper timing of the camera shutter when the camera is pointed at the object to be photographed.

Another object is to provide means which automatically allows for changes in stop opening, ray filters, and the like, if, and when used.

Another object is the provision of such a device on cameras of the reflex type.

These and other objects, as will hereinafter appear, are fully described in the following specification, and shown in the accompanying drawings, in which—

Fig. 5 is a diagram of the connections;

Fig. 6 is a longitudinal section through an attachment mounted on a lens cell showing a modified form of the invention;

Fig. 7 is a front elevation of the same;

Fig. 8 is a partial plan view of the attachment of Figs. 6 and 7;

Fig 9 is still another modified form of the invention mounted on the lens cell;

Fig. 10 is a front elevation of Fig. 9; and

Fig. 11 is a partial plan view of Figs. 9 and 10.

This invention is an improvement upon my invention on Actinometers, as set forth in my application for patent Serial No. 589,586, filed January 29, 1932. The embodiment illustrated in Figs. 1 to 5 inclusive comprises a camera box 15 of the reflex type, having a swinging mirror frame A of any well known type, the mechanism for operating it not being shown, since it is no part of the present invention; a lens cell B adjustably mounted to move back and forth by means of a light-excluding bellows C, a ground glass, a hood E, and a lid F. The lens cell B may have any usual lens, diaphragm and shutter construction. These form no part of the present invention, and hence are not shown in detail. Usually, however, the shutter is in the back of this type of camera.

In general, applicant's invention consists of means for measuring the intensity of the actinic value of light passing through the lens of the camera, and falling on the mirror within the frame A, and of indicating the intensity or actinic value of this light in terms of shutter timing. By this arrangement, no correction is made or needed for the shutter opening, the adjustable diaphragm of the lens cell automatically serving this purpose at all times. To carry out this idea the mirror in the frame A is specially treated on the back so as to render it partly light reflecting, and also sensitive either to the intensity of the light or to certain actinic portions of the light. The light so received upon this mirror generates electrical energy which is measured by a galvanometer G connected therewith in series circuit, and which is suitably graduated in terms of shutter timing. The position of the needle of the galvanometer on the dial is regulated by a knob H, as will later be explained. This galvanometer can be made to measure the voltage, the current, or the wattage generated.

Figure 4:
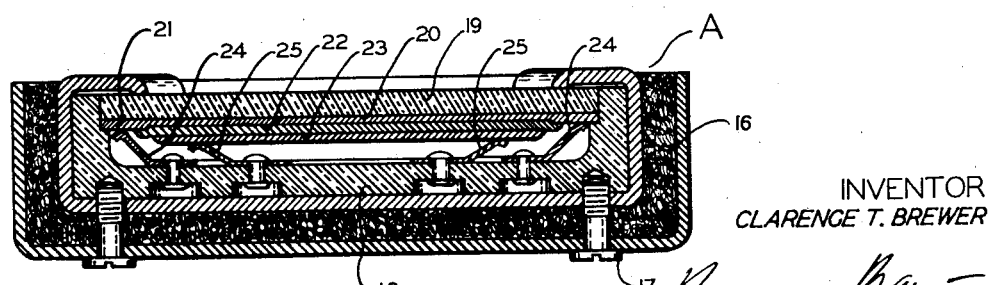
Fig. 4 is an enlarged section on the line 2—2 of Fig. 1 showing the camera mirror modified to embody this invention.

Referring now to Fig. 4, the mirror frame A (greatly enlarged as to depth for the sake of clearness) comprises a tray 18 which is provided with a shoulder to receive the flat glass plate 19, the back of which is sputtered or otherwise provided with a thin coating of nickel, gold, platinum, or the like 20, so that it will permit part of the light striking the front of the plate to pass through, while part of it is reflected so as to reflect the camera image upon the ground glass plate D so as to permit focusing. Metal strips 21 are preferably placed along the edge of the mirror 19 either before or after it is sputtered or otherwise treated with the metal 20 so as to make a good electrical contact with this metallic surface.

The central portion of this surface is then sputtered, or otherwise treated with light sensitive material, such as selenium, molybdenite, argentite, and the like, slightly overlapping the inner edge of the strips 21. This light sensitive coating is also put on very thin, and suitable shields are used along the sides while it is being sputtered to prevent this material covering more than the inner edge of the metal strips 21. The selenium 22 may also be deposited by painting this surface with red crystalline selenium dissolved in carbon-di-sulphide, or other suitable solvent. After either of these treatments this coated plate is placed in a vacuum furnace and annealed at a temperature of 150° C. to 210° C., depending on the wave length of light at which is desired that the cell shall operate. By varying this temperature it can be made more sensitive to the red rays, or more sensitive to the violet rays, crystallization taking place at any temperature between the above limits provided it is maintained at that temperature a sufficient length of time.

Following this operation the selenium surface is given a coating of iron, silver, copper, or the like, 23 which may be sputtered on or otherwise deposited, care again being taken to keep this metal from touching the strips 21 at any spot, since if this occurred the photoelectric cell would be short circuited. If silver is to be applied this may be done by any of the well known methods of silvering mirrors. A coat of varnish may be added, if desired.

Suitable spring fingers, 24, 25 press on the metal strips 21, and the coating 23 respectively so as to make electrical contact therewith. These are connected in an electric circuit, as shown in Fig. 5, the fingers 25 and the coating 23 being connected by a lead 26 to the galvanometer G, while the fingers 24 and the thin metal coating 20 are connected by a lead 27 with a variable resistance 28 over which slides a brush 29 which is actuated by the knob H.

Figure 1:
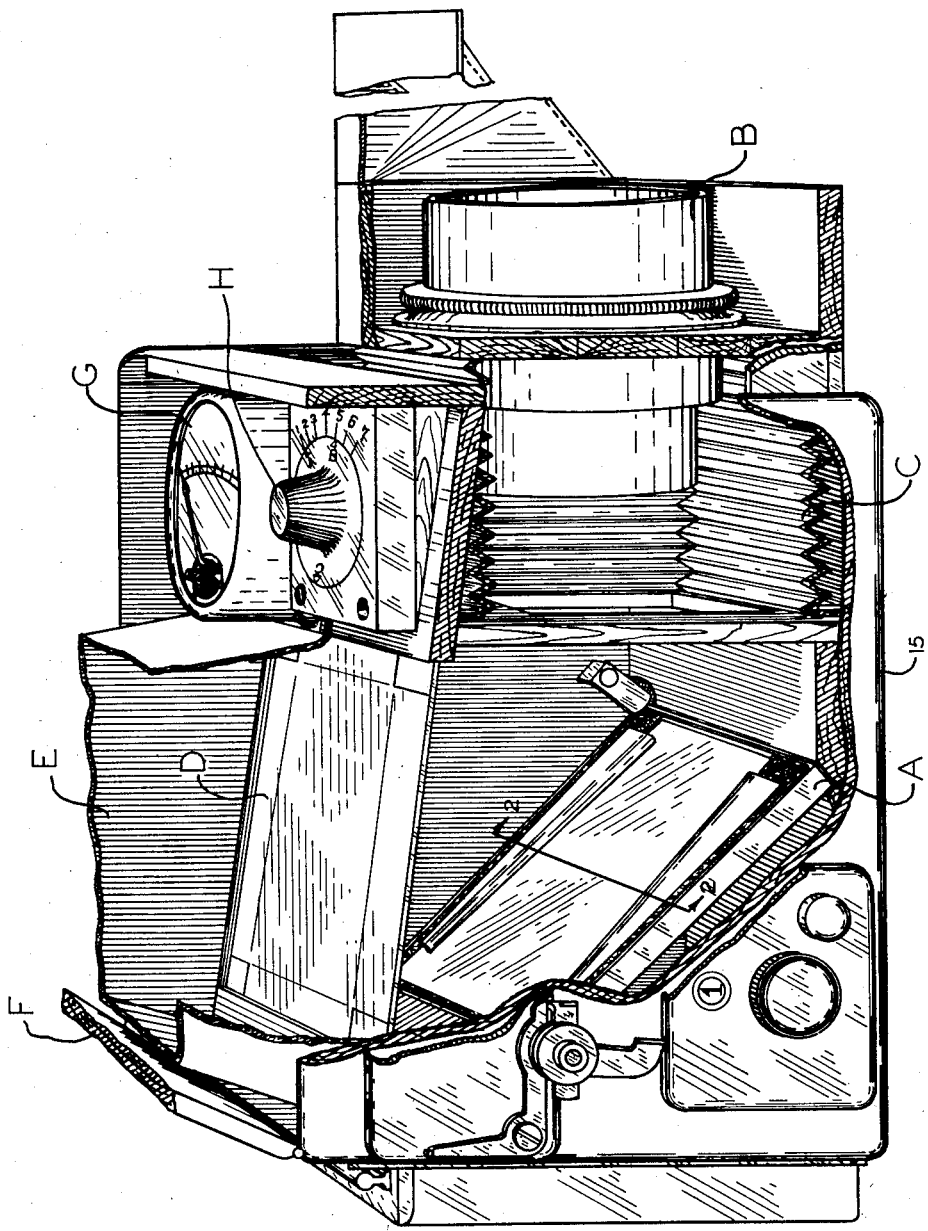
Figure 1 is a perspective view of a camera of the reflex type having the invention built in, parts of the camera being broken away.
Figure 2:
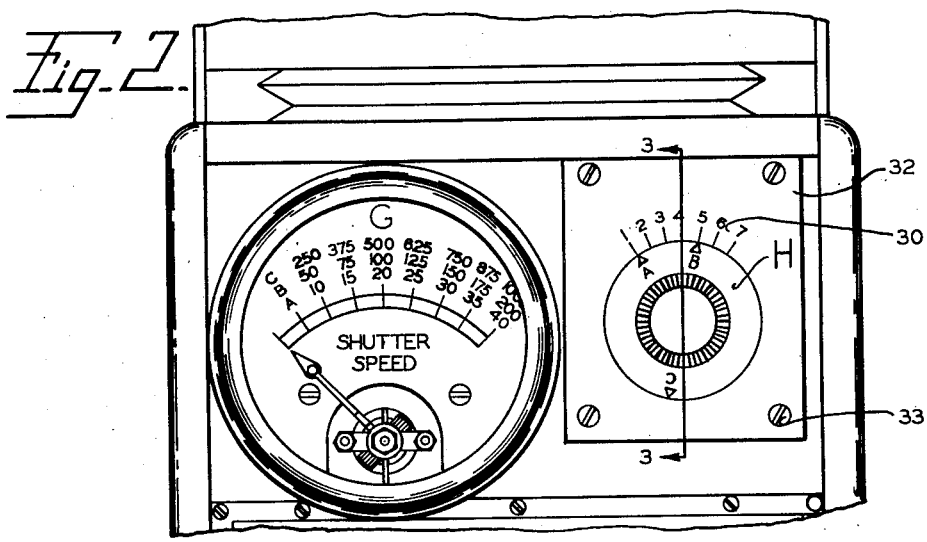
Fig. 2 is a partial top plan view showing the actinometer dial and scale.
Figure 3:
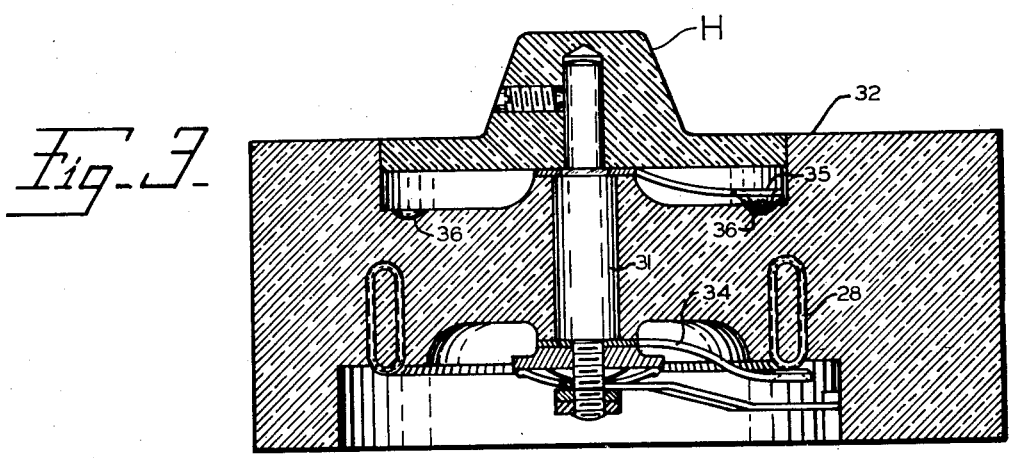
Fig. 3 is an enlarged vertical section on the line 3—3 of Fig. 2 showing the actinometer dial and the resistance controlled thereby.

Details of this are shown in Figs. 2 and 3. This knob has three marks A, B and C which correspond to the three shutter speed scales A, B and C respectively, of the galvanometer. Outside the knob H lies a fixed graduated scale 30 in which the graduations represent emulsion speeds of plates or films graduated to correspond to the resistance 28. In use, the knob H is turned so that the mark B, for example, is opposite the desired film speed, say 5, the galvanometer needle will be moved over its corresponding scale B under the action of light on the photoelectric cell. To read the shutter timing on another scale as C, the mark C is moved to this same emulsion scale reading, in this case 5.

The details shown in Fig. 3 of the knob and associated variable resistance comprises the knob H of Fig. 2 secured on a shaft 31, which is journaled in an insulating block 32 which is mounted in the camera box by means of screws 33. On its opposite end it carries a metal contact finger 34 which bears on the underside of the resistance 28 (see Fig. 5). At the upper end the shaft 31 may carry a spring pawl 35 which is adapted to engage a series of notches 36 in the block 32, or it may merely exert spring pressure on the face of the block so as to provide sufficient friction to prevent the stop from turning unless moved by hand.

In Figs. 6, 7 and 8 is shown a modified form of the device in which the actinic value of light is measured not by what passes through the lens, but by the light falling on a photoelectric cell around or at the side of the lens. This construction consists of a lens cell B' having a casing 37 within which is housed the lens, the cell being mounted on a lens board 38 in the usual way, and this connected by means of a flexible bellows C' to the camera box. About the lens cell casing 37 is rotatably mounted a casing 39 which is preferably flanged and which has on its inner hub a slot 40 through which passes a screw or pin 41 which is secured to the cell B' and which operates the iris diaphragm. This pin serves also to limit the amount of rotation of the casing 39.

A flanged disc 42 is rotatably mounted around the casing 39, and the casing and disc are provided with registering openings $39^a$ and $42^a$ respectively, and both of these sets of openings register with openings $43^a$ in a hollow member 43 which is fixedly secured to the lens cell B'. Within the hollow member 43 is located any convenient form of photoelectric cell 44, such as that which has been previously described in connection with the mirror A, or in my previous application Serial No. 589,586. This cell is connected by means of leads 45 and 46 with a galvanometer, or the like G'.

The flanged disc 42 is graduated, as shown in Fig. 8, with three indicators or marks A, B, C which correspond to the three scales of the galvanometer, as shown in Fig. 2. The casing 39 is likewise graduated to correspond to the numbers given to the emulsion speeds of the various plates and films. As the disc 42 is turned with respect to the casing 39, the opening $42^a$ therein is moved somewhat out of registration with the opening $39^a$, with the result that an end wall $42^d$ of the disc 42 is made to cover part of the opening $39^a$, with the result that less and less light thereby falls on the photoelectric cell as the disc is moved more and more to correspond to faster and faster films. The positions of these graduations must, of course, in all cases be established by calibration. Thus the shutter speed is read directly on the chosen scale of the galvanometer G' corresponding to the marks A, B, or C set at the film speed on the casing 39. Also, the actinometer can be located to one side of the lens cell, and can be geared to the lens cell diaphragm to accomplish the same result.

By omitting the connection to the pin 41, no correction is made for the stop opening of the iris diaphragm. This device could be used with simpler forms of cameras, and would be graduated to correspond, say to a stop opening of "f.32". Consequently, all readings of the galvanometer would indicate shutter timing corresponding to this stop opening, and it would be necessary for the operator to make a further calculation if stop openings other than "f.32" are to be used.

Figs. 9, 10 and 11 show still another modification in which the area of the photoelectric cell on which light falls remains constant, and the value of the current flowing is varied by means of a resistance in series circuit therewith. This is just the opposite of the form shown in Figs. 6, 7 and 8, in which the area of the photoelectric cell is varied while the other electric constants of the circuit remain constant. In the form shown in Figs. 1 to 5 both these variations take place in effect only, instead of varying the portion or area of the photoelectric cell on which light falls, the intensity of the light is varied by the diaphragm opening.

Referring to Fig. 9, the lens cell $B^2$ is mounted as before and carries the photoelectric cell 50 which, as in Fig. 6, surrounds the lens cell. It may occupy one side only, or it may practically surround the lens. The cell 50 lies behind one or two windows 51 in the casing 52 which is carried on the lens cell, and which encloses the photoelectric cell 50. Back of the casing 52 and secured thereto is an insulating block 53 which carries a resistance coil $28^b$. A brush $29^b$ bears thereon and is carried by a flanged disc $42^b$ which is rotatably but frictionally carried by a flanged member $42^c$ which is rotatably mounted on the lens cell and has a screw or pin $41^b$ operating through a slot $40^b$ which serves to limit the rotative movement of the member $42^c$, the pin $41^b$ serving also to operate the diaphragm (not shown).

The resistance $28^b$ is so proportioned to the movement of the diaphragm and to the remainder of the electrical circuit in which it is placed, as shown in Fig. 5, that the electrical energy value as measured by the meter G will be substantially proportional to the area of the diaphragm opening, i. e., to the amount of light falling on the photoelectric cell.

Referring to Fig. 11, the member 42$^c$ has a graduated scale 42$^e$ similar to the marks and scales of the casing 39 and disc 42 respectively, of Fig. 8, and serve the same purposes as those previously stated. Thus it will be seen that a simple and efficient means is provided for utilizing the light emanating from a given object or scene to be photographed to indicate in terms of the desired shutter timing the intensity or actinic value of said light.

It will be understood that in lens mountings where the shutter speed is controlled by turning a sleeve on the lens cell, the process may be reversed and the galvanometer made to read in terms of diaphragm opening.

While I have shown and described but a few embodiments of my invention, it is to be understood that it is capable of many modifications. Changes, therefore, in the construction and arrangement may be made which do not depart from the spirit and scope of the invention as disclosed in the appended claims.

I claim:

1. In combination, a photoelectric cell having a flat glass plate, a very thin metal coating on one side of the plate so as to transmit part of the light received on its surface and to reflect part of the light, a light sensitive coating on the metal coating, a second metal coating on the coating of light sensitive material out of electrical contact with the first mentioned metal coating, means for measuring the transmitted light, and a ground glass for utilizing the reflected light to examine the image cast thereby.

2. In a camera, a box having a lens, a shutter and a diaphragm, space at the back adapted to receive a sheet carrying a sensitized emulsion, a ground glass at one side of the camera box, a mirror hinged so as to cover and uncover said sheet, said mirror including a glass plate, a very thin metal coating on one side of the plate so as to transmit part of the light received on its surface and to reflect part of the light to the ground glass for focusing, and means including a photoelectric cell of which said metal coating is a part for measuring the intensity of the light so transmitted.

3. In a camera, a box having a lens, a shutter and a diaphragm, space at the back adapted to receive a sheet carrying a sensitized emulsion, a ground glass at one side of the camera box, a mirror hinged so as to cover and uncover said sheet, said mirror including a glass plate, a very thin metal coating on one side of the plate so as to transmit part of the light received on its surface and to reflect part of the light to the ground glass for focusing, and means including a photoelectric cell of which said metal coating is a part for measuring the intensity of the light so transmitted.

4. In a camera, a box having a lens, a shutter and a diaphragm, space at the back adapted to receive a sheet carrying a sensitized emulsion, a ground glass at one side of the camera box, a mirror hinged so as to cover and uncover said sheet, said mirror including a glass plate, a very thin metal coating on one side of the plate so as to transmit part of the light received on its surface and to reflect part of the light to the ground glass for focusing, means for measuring the intensity of the light so transmitted,, including a photoelectric cell mounted on the back of the mirror, and a galvanometer connected to said cell.

5. In a camera, a box having a lens, a shutter and a diaphragm, space at the back adapted to receive a sheet carrying a sensitized emulsion, a ground glass at one side of the camera box, a mirror hinged so as to cover and uncover said sheet, said mirror including a glass plate, a very thin metal coating on one side of the plate so as to transmit part of the light received on its surface and to reflect part of the light to the ground glass for focusing, means for measuring the intensity of the light so transmited, including a photoelectric cell mounted on the back of the mirror, and a galvanometer connected to said cell, the first mentioned metal coating serving as one element of the photoelectric cell.

CLARENCE T. BREWER.